US008689330B2

(12) United States Patent
Sinn et al.

(10) Patent No.: US 8,689,330 B2
(45) Date of Patent: Apr. 1, 2014

(54) INSTANT MESSAGING MALWARE PROTECTION

(75) Inventors: Richard Sinn, Milpitas, CA (US);
Hongyan Jiang, Cupertino, CA (US);
Dudley Wong, Sunnyvale, CA (US)

(73) Assignee: Yahoo! Inc., Sunnyvale, CA (US)

(*) Notice: Subject to any disclaimer, the term of this patent is extended or adjusted under 35 U.S.C. 154(b) by 1272 days.

(21) Appl. No.: 11/850,557

(22) Filed: Sep. 5, 2007

(65) Prior Publication Data
US 2009/0064335 A1    Mar. 5, 2009

(51) Int. Cl.
H04L 29/06 (2006.01)
G06F 21/56 (2013.01)

(52) U.S. Cl.
CPC .......... G06F 21/566 (2013.01); G06F 21/561 (2013.01); H04L 63/145 (2013.01)
USPC ........................................................ 726/24

(58) Field of Classification Search
CPC ..... G06F 21/56; G06F 21/566; G06F 56/561; H04L 63/145
USPC ........................................................ 726/24
See application file for complete search history.

(56) References Cited

U.S. PATENT DOCUMENTS

| 6,052,709 A | 4/2000 | Paul |
| 6,393,465 B2 | 5/2002 | Leeds |
| 6,415,318 B1 | 7/2002 | Aggarwal et al. |
| 6,421,709 B1 | 7/2002 | McCormick et al. |
| 6,453,327 B1 | 9/2002 | Nielsen |
| 6,643,686 B1 | 11/2003 | Hall |
| 6,650,890 B1 | 11/2003 | Irlam et al. |
| 6,772,196 B1 | 8/2004 | Kirsch et al. |
| 6,957,259 B1 | 10/2005 | Malik |
| 7,027,463 B2* | 4/2006 | Mathew et al. ............... 370/463 |
| 7,069,316 B1* | 6/2006 | Gryaznov ..................... 709/224 |
| 7,120,455 B1 | 10/2006 | Chen et al. |
| 7,188,367 B1* | 3/2007 | Edwards et al. ................ 726/24 |
| 7,257,842 B2 | 8/2007 | Barton et al. |
| 7,454,789 B2* | 11/2008 | Braverman et al. ............ 726/22 |
| 7,533,272 B1* | 5/2009 | Gordon et al. ................ 713/188 |
| 7,577,993 B2* | 8/2009 | Roychowdhary et al. ...... 726/22 |
| 7,596,599 B1* | 9/2009 | Maghsoodnia et al. ....... 709/206 |
| 7,600,258 B2* | 10/2009 | Desouza et al. ............... 726/24 |
| 7,634,814 B1* | 12/2009 | Sobel et al. ..................... 726/25 |

(Continued)

OTHER PUBLICATIONS

"Antivirus software," Wikipedia, the free encyclopedia, 4 pages, http://en.wikipedia.org/wiki/Virus_scanner, (accessed Nov. 27, 2007).

(Continued)

Primary Examiner — Michael S McNally
(74) Attorney, Agent, or Firm — James J. DeCarlo; Greenberg Traurig, LLP

(57) ABSTRACT

A system including a content server and a plurality of instant messaging clients is configured to enable each client device to scan for malware on incoming or outgoing instant messages. The content server may receive malware configuration information and distribute the malware configuration information to each client device. Each client device may employ the malware configuration information to perform a number of actions, including determining one or more malware scanners to use, selectively scanning incoming or outgoing instant messages, reporting instances of malware that are detected, or selectively restricting one or more instant messaging functions. The system may include a malware information repository that receives and reports of detected malware, analyzes the reports, and determines sources of malware.

20 Claims, 7 Drawing Sheets

(56) References Cited

U.S. PATENT DOCUMENTS

| | | | |
|---|---|---|---|
| 7,756,929 B1* | 7/2010 | Pettigrew et al. | 709/206 |
| 7,822,818 B2* | 10/2010 | Desouza et al. | 709/206 |
| 7,823,200 B2* | 10/2010 | Desouza et al. | 726/22 |
| 7,975,303 B1* | 7/2011 | Millard | 726/24 |
| 7,984,503 B2* | 7/2011 | Edwards | 726/24 |
| 8,201,247 B1* | 6/2012 | Chen et al. | 726/22 |
| 8,312,545 B2* | 11/2012 | Tuvell et al. | 726/24 |
| 2003/0140103 A1 | 7/2003 | Szeto et al. | |
| 2004/0143763 A1* | 7/2004 | Radatti | 713/201 |
| 2004/0177110 A1 | 9/2004 | Rounthwaite et al. | |
| 2004/0255122 A1 | 12/2004 | Ingerman et al. | |
| 2005/0108415 A1* | 5/2005 | Turk et al. | 709/232 |
| 2005/0114456 A1* | 5/2005 | Mathew et al. | 709/206 |
| 2005/0198000 A1* | 9/2005 | Rapp | 707/1 |
| 2006/0015563 A1* | 1/2006 | Judge et al. | 709/206 |
| 2006/0075502 A1* | 4/2006 | Edwards | 726/24 |
| 2006/0101514 A1* | 5/2006 | Milener et al. | 726/22 |
| 2006/0168014 A1* | 7/2006 | Wang | 709/206 |
| 2006/0248575 A1* | 11/2006 | Levow et al. | 726/1 |
| 2006/0253447 A1* | 11/2006 | Judge | 707/9 |
| 2007/0006308 A1* | 1/2007 | Desouza et al. | 726/24 |
| 2007/0112954 A1 | 5/2007 | Ramani et al. | |
| 2007/0192863 A1 | 8/2007 | Kapoor et al. | |
| 2007/0240222 A1* | 10/2007 | Tuvell et al. | 726/24 |
| 2008/0016167 A1* | 1/2008 | Lund et al. | 709/206 |
| 2008/0066180 A1* | 3/2008 | Repasi et al. | 726/24 |
| 2008/0086773 A1* | 4/2008 | Tuvell et al. | 726/23 |
| 2008/0127295 A1* | 5/2008 | Pirzada et al. | 726/1 |
| 2008/0155036 A1* | 6/2008 | Pirzada et al. | 709/206 |
| 2008/0163372 A1* | 7/2008 | Wang | 726/24 |
| 2009/0044264 A1* | 2/2009 | Ramanathan et al. | 726/14 |
| 2009/0307769 A1* | 12/2009 | Curnyn | 726/22 |
| 2009/0307776 A1* | 12/2009 | Curnyn | 726/24 |

OTHER PUBLICATIONS

Iwanchuk, Russ, FindArticles—"IM Anti-Virus and IM Message Inspector," http://findarticles.com/p/articles/mi_zdpcm/is_200106/ai_ziff2220/print, p. 1 of 1, Oct. 29, 2007.

"Malware," Wikipedia, the free encyclopedia, 8 pages, http://en.wikipedia.org/wiki/Malware, (accessed Nov. 27, 2007).

"Instant messaging," Wikipedia, the free encyclopedia, 7 pages, http://en.wikipedia.org/wiki/Instant_messaging, (accessed Nov. 27, 2007).

"Bloom Filter", Wikipedia, the free encyclopedia, 7 pages, http://en.wikipedia.org/wiki/Bloom_filter, (accessed May 22, 2007).

International Search Report and Written Opinion, mailed Jan. 31, 2006 for International Patent Application PCT/US04/35402 filed on Oct. 26, 2004.

* cited by examiner

INSTANT MESSAGING MALWARE PROTECTION

TECHNICAL BACKGROUND

The present invention relates generally to computer security, and more particularly but not exclusively to protecting computer systems from viruses and other malware associated with instant messaging.

Instant messaging (IM) is a computer-based messaging feature that provides real-time communication over a network, such as the Internet. Typically, instant messaging clients connect via the Internet to an instant messaging service, which facilitates communication between the clients. An instant message sent between two clients may appear on the recipient's display almost immediately after sending. The instant messaging service may include servers that receive and forward messages between clients. Yahoo! Messenger is a popular instant messaging service. Yahoo! Messenger includes an IM client application that allows users to send and receive messages. Yahoo! Messenger allows sharing of text, files, photos, as well as audio and video between users. It should be noted that instant messaging is distinguishable from text messaging or email communication, which are generally not considered real-time communications.

Computer viruses, worms, and other malware present threats to the security of computer systems. A number of products have been developed for detecting these threats. Antivirus scanners may scan files looking for matches with definitions in a dictionary of known viruses. If a match is found, the antivirus scanner considers the file to be infected with the corresponding virus. An antivirus scanner may examine a file on a computer's disk storage when the operating system opens or closes it. Antivirus scanners typically can be configured to scan all files on a computer's hard disk, either on a regular schedule or by a manual command. An antivirus scanner, may, for example, be configured to scan a file when the file is received as an attachment in an email and downloaded to the client's hard disk.

Computer viruses and worms are appearing in instant messaging environments. Malware may be inserted into instant messages. Due to the fast communication feature of instant messaging, malware may reproduce and distribute itself quickly across many IM users. Thus, effective ways of detecting, preventing, and handling IM malware are needed, as is the ability for configuring anti-malware systems in ways that allow for a variety of client environments and situations. Thus, it is with respect to these considerations, and others, that the present invention was made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Descriptions, which is to be read in association with the accompanying drawings, wherein.

DETAILED DESCRIPTION OF THE INVENTION

Figure 1:
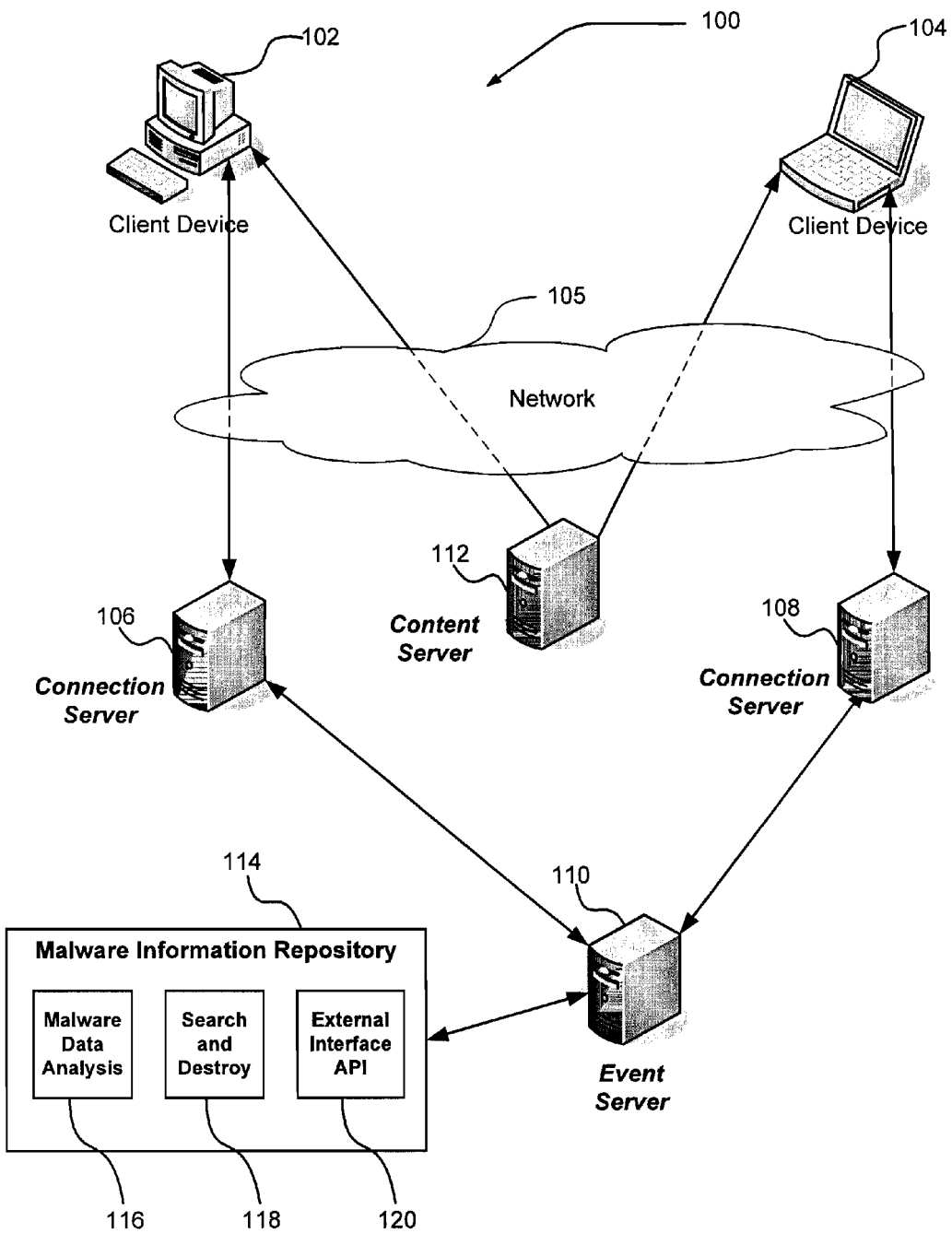
FIG. 1 shows a functional block diagram illustrating an environment for practicing the invention.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Instant messaging (IM) is a messaging mechanism that may be used to send instant messages across a network, between two or more client devices, in real time. Instant messages may include text, photos, pictures, audio, or video. Instant messaging systems may provide functions that allow easy sharing of photos, streaming video, or other useful functions.

Malware is software designed to infiltrate or damage a computer system without the owner's informed consent. The term malware includes computer viruses, worms, trojan horses, spyware, key loggers, dishonest adware, or other malicious software. Malware may be embedded in or accompany an instant message and sent using an instant messaging system between IM client devices.

Briefly, the present invention is directed towards a method, apparatus, and system for protecting a computing system from malware that may be distributed via an instant messaging system. Mechanisms of the invention may detect malware prior to transmission or after receipt by a client device communicating within an instant messaging system. The system may be configured in a manner that allows a centralized configuration with respect to a plurality of client devices, while scanning for malware is performed by the client devices themselves. Mechanisms of the invention include configuring one or more factors that may be used to determine when scanning for malware is to be performed, how to perform scanning, and actions to take if malware is detected.

Mechanisms of the invention may include receiving, from a server, malware configuration information stored on the server, receiving an instant message, and selectively employing a malware scanner to scan the instant message, at least partly based on the malware configuration information. A process may determine the malware scanner to employ based on the malware configuration information or information associated with the instant message. A process may employ multiple scanners to scan the instant message, and determine an ordering to employ the malware scanners based on information associated with the instant message.

Mechanisms of the invention may include selectively employing a malware scanner based on a geographic location associated with the sender, a group membership of the sender, or a type of the instant message.

Mechanisms of the invention may include, if malware is detected, sending associated information to a malware information repository, disabling a function associated with the instant message, or restricting messages from the sender.

Mechanisms of the invention may include a malware information repository that receives and stores reports of malware instances, analyzes the data, determines a source of the malware, and takes actions to restrict the distribution of the malware.

Although the embodiments are described within in terms of an Internet architecture, the invention is not so limited. For example, various embodiments may also employ a variety of other types of networks or communication mechanisms, or physical storage media, without departing from the scope of the invention.

Illustrative Environment

FIG. 1 is a functional block diagram illustrating an exemplary operating environment 100 in which the invention may be implemented. Operating environment 100 is only one example of a suitable operating environment and is not intended to suggest any limitation as to the scope of use or functionality of the present invention. Thus, other well-known environments and configurations may be employed without departing from the scope or spirit of the present invention.

As shown in the figure, operating environment 100 includes client devices 102-104, connection servers 106-108, an event server 110, a content server 112, a malware information repository (MIR) 114, and network 10S. Client device 102 is in communication with connection server 106, which is in communication with event server 110. Client device 104 is in communication with connection server 108, which is in communication with event server 110. Client devices 102-104 are also each in communication with content server 112. Event server 110 is in communication with MIR 114. In one embodiment, client devices 102 and 104 may both be in communication with the same connection server, such as connection server 106. In one embodiment, client devices 102 and 104 may be in direct or indirect communication with each other without needing to communicate through a connection server or an event server.

Each of client devices 102-104 may include virtually any computing device capable of receiving and sending a message over a network, such as network 105, to and from another computing device. The set of such devices described in an exemplary embodiment below generally includes mobile devices that are usually considered more specialized devices with limited capabilities and typically connect using a wireless communications medium such as cell phones, smart phones, pagers, radio frequency (RF) devices, infrared (IR) devices, CBs, integrated devices combining one or more of the preceding devices, or virtually any mobile device, and the like. However, the set of such devices may also include devices that are usually considered more general purpose devices and typically connect using a wired communications medium at one or more fixed location such as laptop computers, personal computers, multiprocessor systems, microprocessor-based or programmable consumer electronics, network PCs, and the like. Similarly, client device 102 may be any device that is capable of connecting using a wired or wireless communication medium such as a personal digital assistant (PDA), POCKET PC, wearable computer, and any other device that is equipped to communicate over a wired and/or wireless communication medium.

Each of client devices 102-104 may include an application that enables a user to perform various operations. For example, each client device may include one or more messenger applications that enables the client device to send and receive messages to/from another computing device employing various communication mechanisms, including, but not limited to Short Message Service (SMS), Multimedia Messaging Service (MMS), Instant Messaging (IM), internet relay chat (IRC), Mardam-Bey's internet relay chat (mIRC), Jabber, email, and the like.

Network 105 is configured to couple each of client devices 102-104, with other devices, such as connection servers 106-108 and content server 112. Though not illustrated in FIG. 1, other communications between devices or systems, such as connection servers 106-108, content server 112, event server 110, and MIR 114, as well as other devices not illustrated, may employ network 105 alone or in combination with other communication mechanisms. Any of these components may also communicate with each other without employing network 105. The discussion of network 105 is therefore applicable to communication between any network components illustrated or described herein.

Network 105 is enabled to employ any form of computer readable media for communicating information from one electronic device to another. In one embodiment, network 105 is the Internet, and may include local area networks (LANs), wide area networks (WANs), direct connections, such as through a universal serial bus (USB) port, other forms of computer-readable media, or any combination thereof. On an interconnected set of LANS, including those based on differing architectures and protocols, a router may act as a link between LANs, to enable messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art.

Network 105 may further employ a plurality of wireless access technologies including, but not limited to, 2nd (2G), 3rd (3G) generation radio access for cellular systems, Wireless-LAN, Wireless Router (WR) mesh, and the like. Access technologies such as 2G, 3G, and future access networks may enable wide area coverage for network devices, such as client device 102, and the like, with various degrees of mobility. For example, network 105 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like.

Furthermore, remote computers and other related electronic devices could be remotely connected to either LANs or WANs via a modem and temporary telephone link. In essence, network 105 includes any communication method by which information may travel between client devices 102-104, connection servers 106-108, content server 112, event server 110, and MIR 114.

Additionally, network 105 may include communication media that typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as, but not limited to, twisted pair, coaxial cable, fiber optics, wave guides, and other wired media and wireless media such as, but not limited to, acoustic, RF, infrared, and other wireless media.

Connection servers 106-108 may serve as an intermediary to connect each of clients 102-104, respectively, to the instant communications network, and to forward messages between clients. Each client may have a corresponding connection server that it communicates with to perform actions such as logging in and sending messages. In one embodiment, client 102 may log in to the network by performing a login action with connection server 106. After logging in, client 102 may send messages to other clients, such as client 104 by transmitting the message to connection server 106. As illustrated in FIG. 1, connection server 106 may then forward the message to event server 110, which then may forward the message to connection server 108. Connection server may then forward the message to client 104. Messages sent to client 102 may be received by connection server 106, which then forwards them to client 102. Similarly, connection server 108 may perform the corresponding actions for client 104. Each connection server may also be configured to perform other actions. For example, when a client logs out of the system, its corresponding connection server may send messages to other associated clients, notifying them of the log out.

A connection server typically corresponds to many client devices. In an environment where two client devices sharing the same connection server communicate with each other, a message may be transmitted from one client device to the connection server, and then to the second client device, without going through an event server or through another connection server.

In one environment, a client device may communicate with a second client device without employing a connection server as an intermediary. This may be referred to as a peer-to-peer communication. In this environment, each client device may login by communicating with a connection server, and then send messages directly or indirectly to the second client, without employing the connection server to forward messages. This configuration may occur in an environment where both client devices are on a common local area network.

Event server 110 may receive information from connection servers 106-108, and process, store, or forward it. For example, event server 110 may receive information relating to a user logging in or logging out at a client device, or a disconnection. Event server 110 may employ information relating to the system topology, in order to facilitate communications between client devices. Event server 110 may, for example, receive a request from connection server 106 to locate client device 104, in order to establish a communication between client 102 and client 104.

Malware information repository (MIR) 114 may perform a number of functions. It may maintain a database of known malware. This database may include data relating to each malware instance, such as identification of clients that have detected it, dates and times of detection, geographic distribution, clients that have been identified as sources of malware, instant communication functions in which the malware was detected, as well as other information. MIR 114 receives reports from client devices when malware is detected.

In the embodiment illustrated in FIG. 1, MIR 114 includes a malware data analysis component 116, a search and destroy manager 118, and an external interface API 120. The data analysis component may be configured to perform analysis on data pertaining to malware detected in the system. It may generate reports descriptive of the malware data and analysis. For example, for a specified malware instance, data analysis component 116 may determine the time it takes to spread among clients, geographic or topological patterns or paths corresponding to the distribution, geographic areas that are most affected, clients or areas where the distribution began or which serve as hubs of its distribution, and the like. Data analysis component 116 may analyze the effectiveness of various error handling actions to protect clients and contain the distribution of malware.

Search and destroy manager 118 may be configured to determine, based on MIR data, one or more clients that are the source of a malware instance. This information may be used to disable communication with a source, or otherwise prevent or reduce malicious actions. Search and destroy manager 118 may determine that one or more clients are to be prevented from logging in to the system, if appropriate. Search and destroy manager may also enable client devices to repair damage related to receipt of malware by sending instructions or data that a client device may employ to delete, replace, or modify corrupted data.

The external interface API 120 enables communication with external systems. In one embodiment, a system may employ the external interface API 120 to cross reference MIR data with an email system to assist in identifying a source of malware, or to disable a malware source on multiple systems. For example, an email system or associated system may employ the external interface API 120 to submit or retrieve MIR data, so that a client distributing malware on an IM system may be prevented from sending email or logging in to another system, or conversely, to notify the IM system of malicious email clients. In another example, a web site may employ the external interface API 120 to retrieve MIR data and prevent a client distributing malware on an IM system from logging in or using at least some services of the web site.

Each of clients 102-104 communicates with content server 112. Content server 112 may provide various content, or facilitate the retrieval of content, to each of the clients. One example of this content relates to search keywords. The content server may store a set of common keywords or keyword combinations, and provide all or a portion of this set to client devices. When a user of a client device selects a word within a text area, the keyword set may be used to suggest completions of the keyword or phrase, or various contexts relevant to the selected word, in order to facilitate a search or retrieval of relevant documents or information.

A systems administrator may interface with the content server to set up various configuration information related to security. In particular, content server 112 may maintain configuration information in the form of data, rules, or instructions that indicate decisions or actions that each client is to perform upon receiving an instant message, or prior to sending an instant message. This may include decisions as to whether a client is to reject a message, perform malware scanning of the message, or allow the message without scanning. If scanning is to be performed, the configuration information may indicate which scanners are to be employed, and in what order they are to be employed. The configuration information may indicate distinctions between groups of clients, such that clients belonging to different groups may take different actions. Groups of clients may be distinguished by source address, such as IP address, by geographical location, by membership or class of membership in an organization, subscription to a service, or by another type of grouping.

The malware configuration information may also indicate, for a specified group of users, a type of action that is to be taken if malware is detected. The actions may include one or more of allowing the message to proceed, rejecting the message, destroying the malware within the message, performing remedial actions, reporting the detection, adding the message source to a blacklist, or disabling the function associated with the message type. Generally, the malware configuration information allows a client device to determine, based on a number of factors, actions to perform when receiving or sending instant messages, and when malware is detected. This logic is discussed in further detail herein.

Each of the components described above, specifically, the connection servers 106-108, event server 110, content server 112, or MIR 114 may include one or more of a computing device, a storage device, or a communication mechanism. Each of these components may include, but are not limited to personal computers, desktop computers, multiprocessor systems, microprocessor-based or programmable consumer electronics, network PCs, servers, network appliances, and the like. Each component may communicate over network 105, another network having technology as described for network 105, or another communications mechanism.

Although the components of FIG. 1 are illustrated as distinct network devices, the invention is not so limited. For example, a single network device may be configured to perform the operational aspects of event server 110 and MIR 114. Similarly, any portion or all of the operational aspects of connection servers 106-108, event server 110, content server 112, OR MIR 114 may be combined in one or more devices or distributed among two or more devices in a variety of configurations.

Illustrative Client Device

Figure 2:
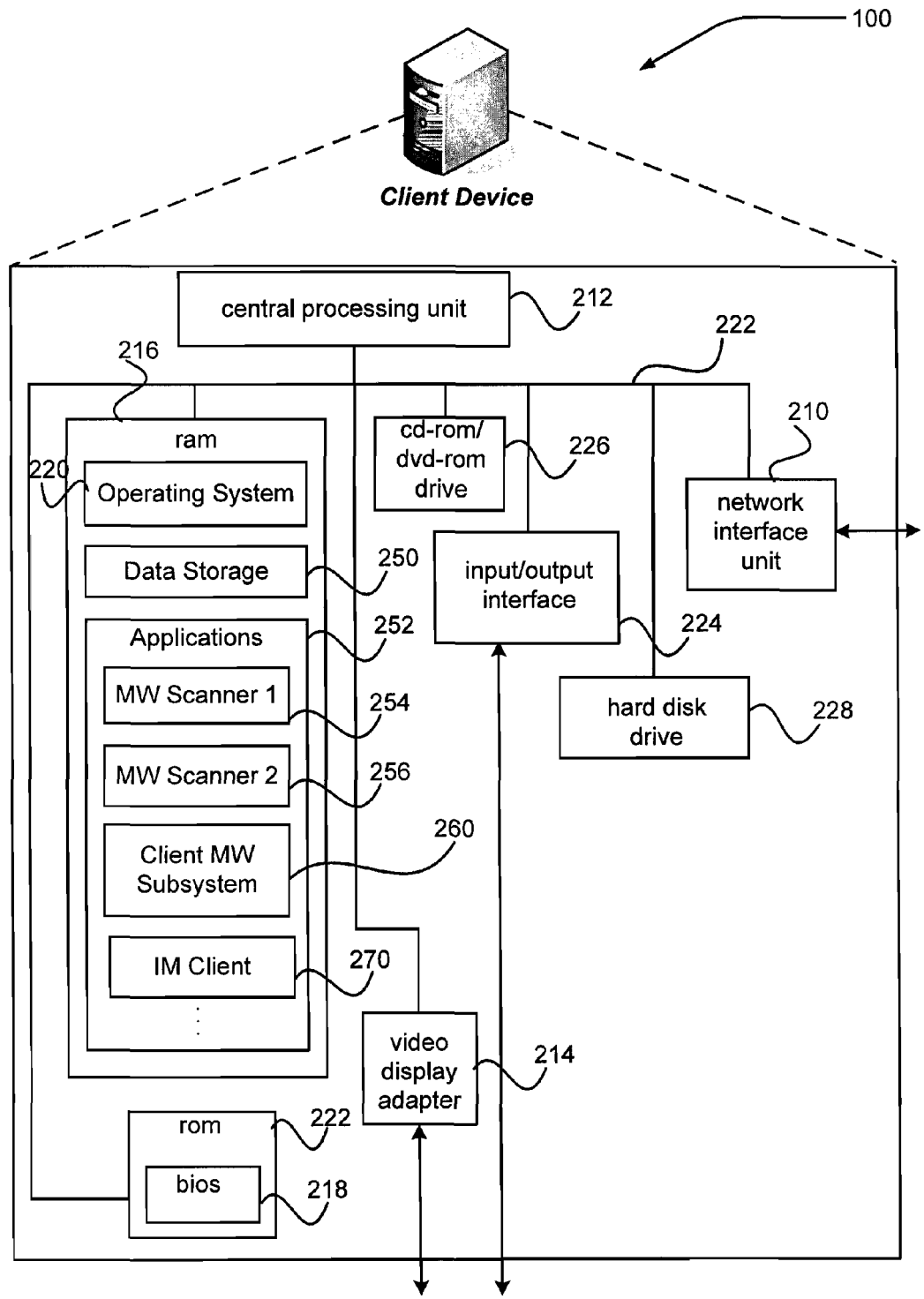
FIG. 2 shows one embodiment of a computing device that may be employed.

FIG. 2 shows one embodiment of a client device 200 that may be included in a system implementing the invention. Client device 200 may include many more or less components than those shown. The components shown, however, are sufficient to disclose an illustrative embodiment for practicing the invention. Client device 200 may represent client device 102 or 104 of FIG. 1.

As illustrated, client device 200 includes processing unit 212, video display adapter 214, and a mass memory, all in communication with each other via bus 222. The mass memory generally includes RAM 216, ROM 232, and one or more permanent mass storage devices, such as hard disk drive 228, tape drive, optical drive, and/or floppy disk drive. The mass memory stores operating system 220 for controlling the operation of client device 200. Any general-purpose operating system may be employed, such as a version of Windows, Unix, Linux, or the like. Basic input/output system ("BIOS") 218 is also provided for controlling the low-level operation of client device 200. As illustrated in FIG. 2, client device 200 also can communicate with the Internet, or some other communications network, via network interface unit 210, which is constructed for use with various communication protocols including the TCP/IP protocol. Network interface unit 210 is sometimes known as a transceiver, transceiving device, network interface card (NIC), or the like.

Client device 200 may also include an SMTP handler application for transmitting and receiving email. Client device 200 may also include an HTTP handler application for receiving and handing HTTP requests, and an HTTPS handler application for handling secure connections. The HTTPS handler application may initiate communication with an external application in a secure fashion.

Client device 200 also may include input/output interface 224 for communicating with external devices, such as a mouse, keyboard, scanner, or other input devices not shown in FIG. 2. Likewise, client device 200 may further include additional mass storage facilities such as CD-ROM/DVD-ROM drive 226 and hard disk drive 228. Hard disk drive 228 is utilized by client device 200 to store, among other things, application programs, databases, or the like.

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more data storage components 250 may include program code or data used by the operating system 220 or by applications 252. Data may be stored in ram 216 or other storage devices, such as hard disk drive 228. One or more applications 252 are loaded into mass memory and run on operating system 220. Examples of application programs include email programs, browsers, schedulers, calendars, transcoders, database programs, word processing programs, spreadsheet programs, security programs, web servers, and so forth.

A browser application may be configured to receive and to send content in a variety of forms, including, but not limited to markup pages, web-based messages, audio files, graphical files, file downloads, applets, scripts, text, and the like. A browser application may display content, such as markup pages, or web pages, that it receives. When a user interacts with a browser application by using a keyboard, pointer device, verbal commands, or other input mechanism, the browser application may respond by performing actions such as requesting a new web page or other content, sending information to a server, displaying additional information or playing audio data, or the like. A browser application may be configured to receive and display graphics, text, multimedia, and the like, employing virtually any network protocol or markup based language, including, but not limited to a Handheld Device Markup Language (HDML), such as Wireless Markup Language (WML), WMLScript, JavaScript, and the like, Standard Generalized Markup Language (SGML), HyperText Markup Language (HTML), Extensible Markup Language (XML).

Mass storage may further include applications such as anti-malware scanners 254-256. Anti-malware scanners are configured to scan data for viruses, worms, spyware, trojan horses, or other malicious software. Anti-malware scanners are sometimes referred to as anti-virus scanners, or simply virus scanners. Norton AntiVirus, by Symantec Corp. and VirusScan Plus, by McAfee Corp. are examples of anti-malware scanners. Anti-malware scanners 254-256 may be from the same or different vendors. Mass storage may further include client anti-malware subsystem 260, which is illustrated in further detail in FIG. 3, and IM client 270.

IM client 270 may be configured to initiate and manage an instant messaging session, including, but not limited to AOL Instant Messenger, Yahoo! Messenger, NET Messenger Server, ICQ, and the like. In one embodiment, IM client 270 is configured to employ a VOIP client (not shown) to integrate IM/VOIP features. Thus, in one embodiment, IM client 270 may employ SIP to establish media sessions with another computing device employing an IM/VOIP capable client, and RTP to communicate the media traffic. However IM client 270 is not so limited. For example, IM client 270 may also employ any of the following SIMPLE (SIP for Instant Messaging and Presence Leverage), APEX (Application Exchange), Prim (Presence and Instant Messaging Protocol), the open XML-based XMPP (Extensible Messaging and Presence Protocol), more commonly known as Jabber and OMA (Open Mobile Alliance)'s IMPS (Instant Messaging and Presence Service) created specifically for mobile devices, and the like.

IM client may perform one or more functions, each function corresponding to a type of instant message. For example, an instant message comprising text may have a corresponding text handler that performs a function of processing and displaying text of the message. A photo message may have a corresponding photo handler that performs a function of processing and displaying or storing a photo of the message. An audio or video handler may perform a function of playing audio or video received in a message or streamed to the receiving client. In one embodiment, a message may be of more than one type, such as a message that includes text and audio.

Though anti-malware scanners 254-256 and client anti-malware subsystem 260 are represented as separate applications executing on client device 200, the invention is not so limited. The representation may be a logical representation, and the logic and configuration of anti-malware scanners 254-256 and anti-malware subsystem 260 may be combined in one application or distributed in multiple applications, or on multiple devices in a variety of ways.

Figure 3:
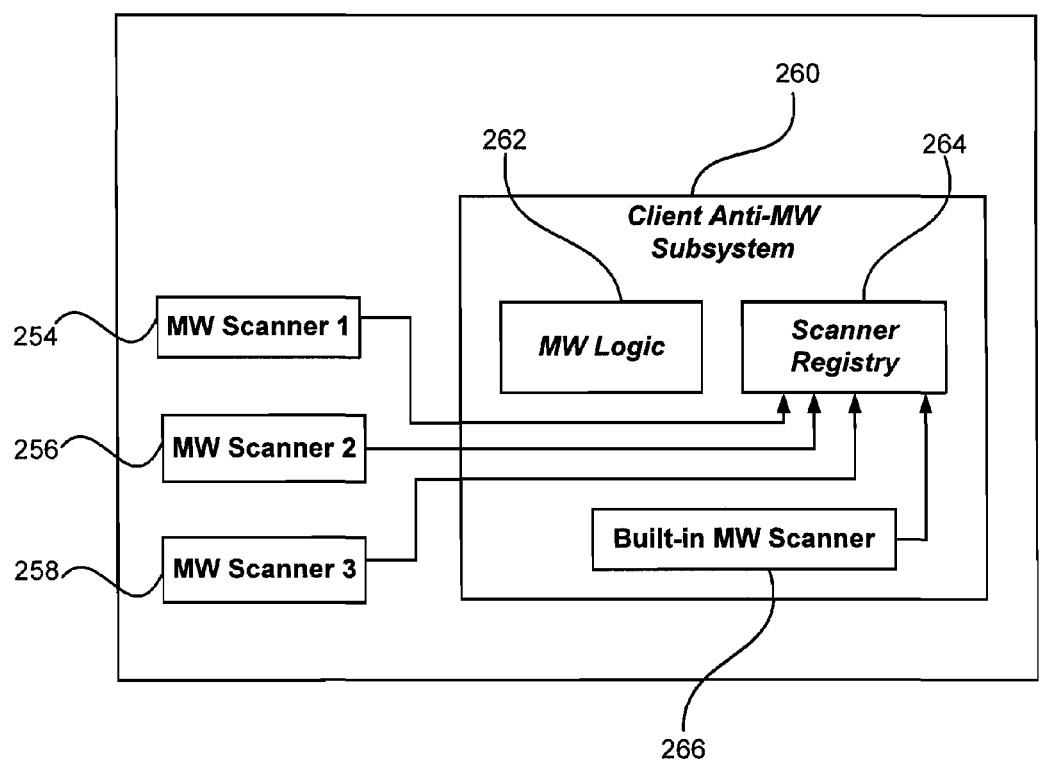
FIG. 3 shows a block diagram of components of an anti-malware system, in accordance with an embodiment of the invention.

FIG. 3 illustrates, in further detail, an embodiment of some of the components illustrated in FIG. 2 that may reside in client device 200. FIG. 3 includes anti-malware scanners 254-256, discussed above, as well as an additional anti-malware scanner 258. Anti-malware scanners 254-258 may be programs distributed by a single vendor or by different vendors. Each of the anti-malware scanners may differ with respect to the type of malware they detect, the logic they use to detect malware, the database of malware signatures they employ, the types of data they may scan, or other factors. For example, one anti-malware scanner may focus on detecting viruses and worms, while another one may focus on detecting spyware. As another example, scanners may differ in their ability to scan for malware distributed from a specific geographic region, such that one scanner is preferable for a first region, while another scanner is preferable for another region. As another example, one scanner may be better for scanning photographs, while another may be preferable for scanning text. As discussed herein, one aspect of the present invention may take advantage of differing capabilities of each scanner. It is not necessary that scanners differ as described, however. The invention may be practiced with scanners that operate on similar data and scan for similar sets of malware.

FIG. 3 also illustrates client anti-malware subsystem 260. In the illustrated embodiment, anti-malware subsystem 260 includes a malware logic component 262, a scanner registry 264, and a built-in anti-malware scanner 266. Built-in anti-malware scanner 266 is similar to the anti-malware scanners 254-258, and the description of the latter applies to it. However, built-in anti-malware scanner 266 may be more closely, or completely integrated with the client anti-malware subsystem 260, and may be distributed to clients with the anti-malware subsystem 260. Client anti-malware subsystem may include zero, one, or more built-in anti-malware scanners.

Scanner registry 264 may store data and perform actions relating to a set of anti-malware scanners that reside on, or are accessible by, a client device, such as client devices 102-104 of FIG. 1. In the embodiment illustrated by FIG. 3, scanner registry 264 may store a list of scanners including MW scanners 254-258 and built-in MW scanner 266. For each scanner, scanner registry 264 may store data enabling access to the scanner, authentication of the scanner, features, or capabilities of the scanner. This data may include the location of the scanner, a process or thread identifier, structures, configurations, parameters or other interface data for accessing, invoking, or controlling the scanner. The data may also include public key or other certificates associated with a scanner, to facilitate authentication.

Figure 4:
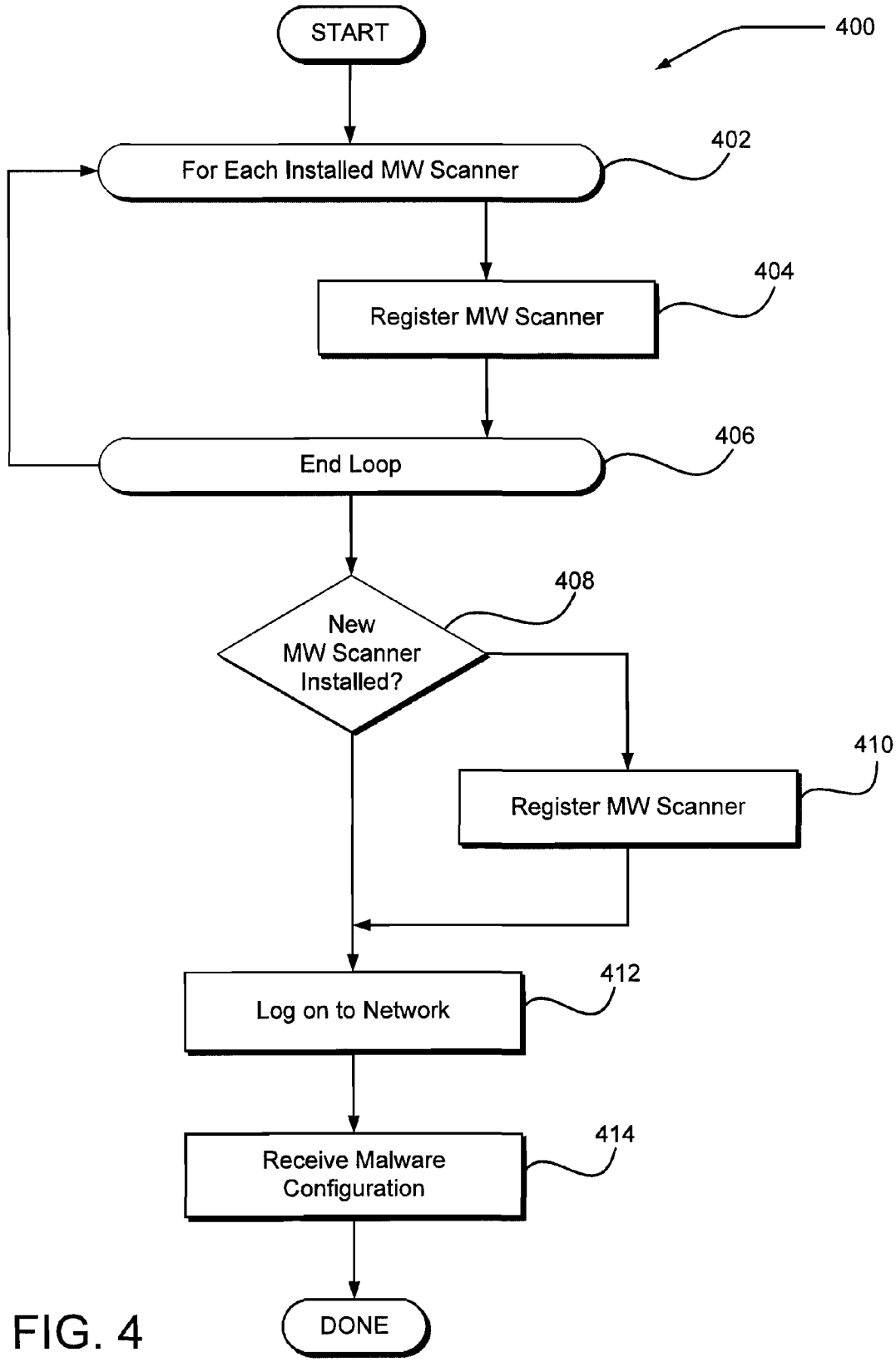
FIG. 4 illustrates a flow diagram generally showing an embodiment of a process for initializing an anti-malware system.

Scanner registry 264 may also include logic or instructions for registering each scanner, obtaining scanner data, or updating scanner data. In one embodiment, a scanner or associated installer may perform actions to register itself with the scanner registry when it is installed or updated, or to notify the scanner registry 264 when it is disabled or uninstalled from the system. In one embodiment, when the scanner registry 264 is installed or enabled, it may determine the set of scanners existing in the system and perform actions to install each scanner. Actions associated with scanner registration are illustrated in FIG. 4 and discussed in further detail herein.

Figure 5:
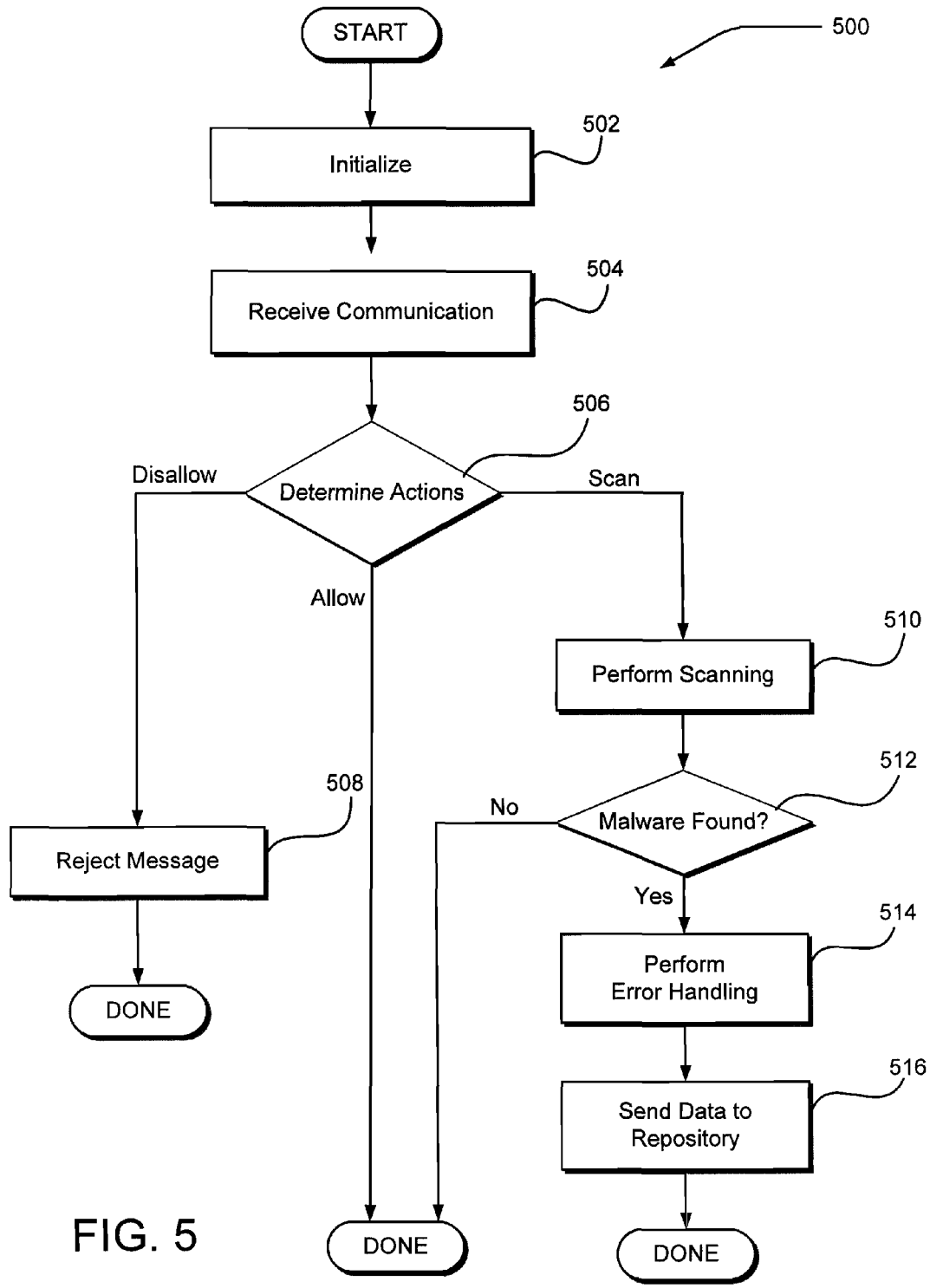
FIG. 5 illustrates a flow diagram generally showing a process for detecting and handling malware, in accordance with an embodiment of the invention.
Figure 6:
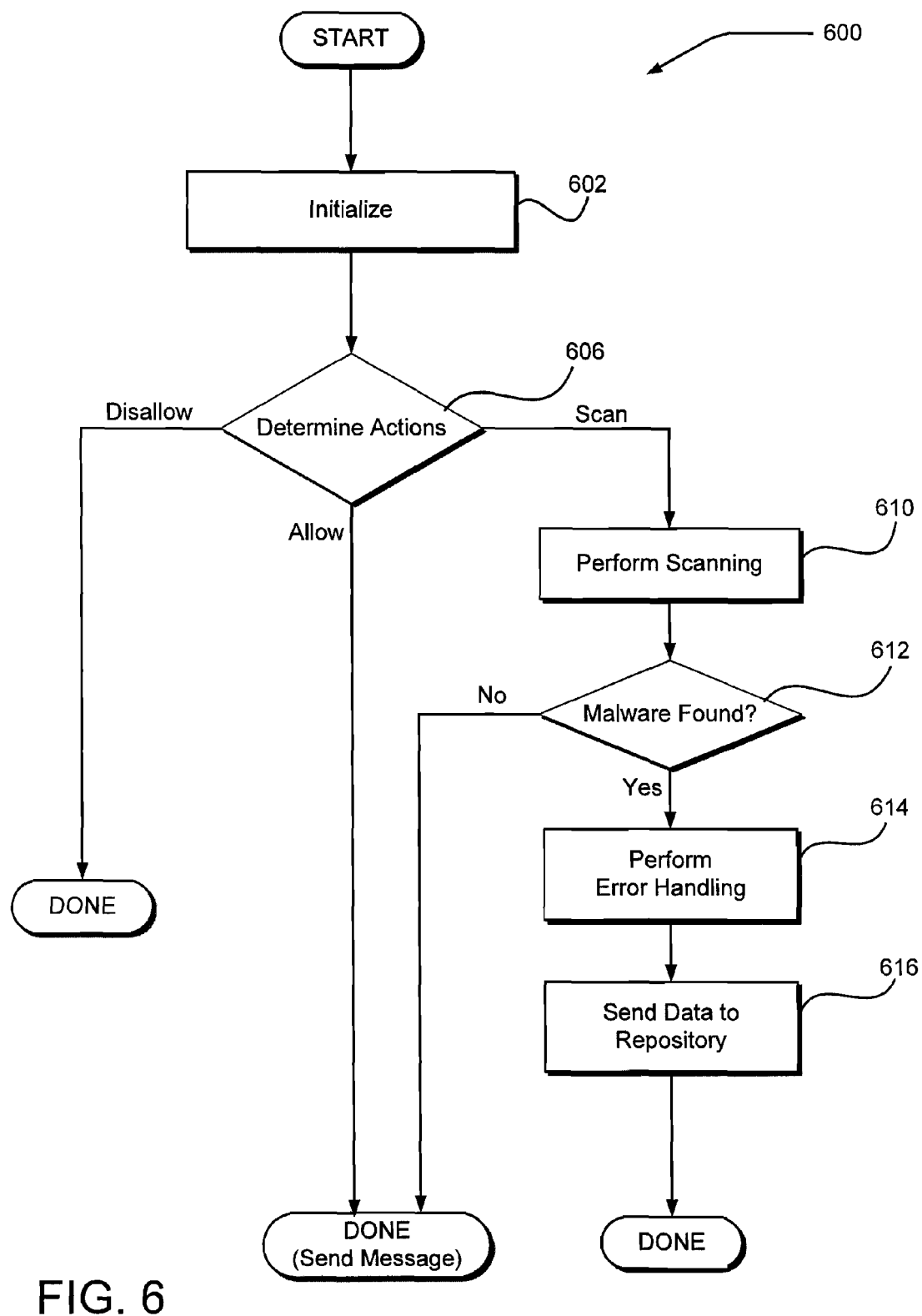
FIG. 6 illustrates a flow diagram generally showing a process for detecting and handling malware, in accordance with an embodiment of the invention.

Malware logic component 262 may include logic or instructions for receiving or storing malware configuration information, and for performing actions in response to receiving an instant message or preparing to transmit an instant message. More specifically, malware logic component may receive malware configuration information from a network device such as content server 112 of FIG. 1, and store this information. In response to receiving an instant message, malware logic component may, at least partly based on the malware configuration information, determine whether to allow the function associated with the message to proceed, whether to scan the message, what scanners to employ for scanning and in what order to employ them, or what actions to employ if an instance of malware is detected. Based on these or other determinations, malware logic component may manage scanning of the message and perform one or more malware detection actions. It may also send a report of its determinations or actions to a component of the system, such as MIR 114 of FIG. 1. Actions associated with malware logic component 262 are illustrated in FIGS. 5-6 and discussed in further detail herein.

Generalized Operation

The operation of certain aspects of the invention will now be described with respect to FIGS. 4-7. FIG. 4 illustrates a flow diagram generally showing one embodiment of a process for initializing an anti-malware system. Process 400 of FIG. 4 may be implemented within various components of a client device, such as client devices 102 or 104 of FIG. 1.

Process 400 begins, after a start block, at block 402, where a loop begins for registering one or more installed MW scanners, such as scanners 254-258 of FIG. 3. The loop beginning at block 404 and ending at block 406 may be performed in an environment where a client MW subsystem 260, or a scanner registry 264 is installed, initialized, enabled, or restored, and there exist one or more scanners previously installed on the client device or system. In one embodiment, built-in MW scanners, such as built-in MW scanner 266 may be registered as part of the loop beginning at block 402.

Processing may flow to block 404, where an MW scanner is registered with the scanner registry 264. This action may include identifying the MW scanner to be registered. Identification of the MW scanner may be performed by retrieving information from an operating system or other registry, by retrieving information from a file system, by examining executing processes or memory locations where information about MW scanners may reside, by broadcasting a message to executing processes, or another technique. Upon, or in conjunction with, identifying an MW scanner, information associated with the scanner may be retrieved. As discussed herein, this data may include data enabling access to the scanner, authentication of the scanner, features, or capabilities of the scanner.

In one embodiment, the actions of block 404 may include retrieving a certificate, such as a public key certificate, corresponding to the scanner, and verifying the authenticity of the scanner. In one embodiment, a retrieved checksum or hash value corresponding to the scanner may be compared with a similar computation to determine that the scanner is valid or has not been improperly modified.

In one embodiment, registration of the MW scanner may include storing at least a portion of the information corresponding to the scanner in a storage medium in the client system, such as the various storage medium illustrated and described in FIG. 2.

Processing may then flow to block 406, where the loop beginning at block 402 ends. The process may determine whether the loop is to be iterated through at least one more time, or whether the loop is to be exited. In one embodiment, the process may determine that there are no MW scanners to register, and the actions of block 404 are performed zero times. The loop beginning at block 402 may result in a number of iterations equal to the number of MW scanners to be registered.

Processing may then flow to block 408. At block 408, a determination is made of whether a new MW scanner has been installed, enabled, or restored. This may occur, for example, in an environment where an MW scanner is installed after the client MW subsystem is installed. In one embodiment, an MW scanner that is installed prior to the client MW subsystem may send a message or command to the client MW subsystem to inform it that it is in the system, it is executing, or updated in another manner. Thus, in various configurations, an MW scanner may be registered in the actions of block 404, in the actions of block 410, or both.

If, at block 408, it is determined that an MW scanner has been installed, enabled, or updated, the process 400 may flow to block 410, where the MW scanner is registered with the scanner registry 264. The actions of block 410 may be substantially similar to the actions described above in relation to block 404 and elsewhere herein. In one embodiment, a previously registered MW scanner may be reregistered at block 410, such as when at least some of its information is updated. This may occur in a variety of situations, including an update to the instructions or data corresponding to the MW scanner, a revision of the scanner's configuration, a change in location, a change in a process ID, or the like.

Though not illustrated in FIG. 4, in one embodiment, process 400 may include actions to determine that an MW scanner has been uninstalled or disabled. In response, the process may perform actions to update the scanner registry 264 to reflect the status change of the MW scanner. These actions may include updating or deleting information corresponding to the MW scanner.

The process may then flow to block 412, where the client performs a log on to an IM network. An IM network may include one or more servers or components that facilitate an IM service. In the environment of FIG. 1, an IM network may include connection servers 106-108, event server 110, and content server 112, or a portion thereof, or other servers. In one embodiment, connection servers 106-108 may reside on different IM networks that communicate with each other and enable clients belonging to respective networks to send IM messages to each other.

Logging on to an IM network may include an authentication protocol, such as submitting a user identifier or password. In one embodiment, a client device may log on to an IM network by communicating with a corresponding connection server and performing actions of a log on protocol. In the environment of FIG. 1, client device 102 may log on by performing a communication with connection server 106, and client device 104 may log on by performing a communication with connection server 108.

The process may flow to block 414, where malware configuration information may be received. In one embodiment, a client device may download configuration information from a content server, such as content server 112 of FIG. 1. The action of receiving malware configuration information may occur any number of times, and may occur at a variety of times. The information, or a portion thereof, may be received right after logging on to the IM system, at periodic times, or in response to an update of the configuration data. In one embodiment, configuration data may be requested and received approximately every 24 hours.

In one embodiment, the malware configuration information received by a client device is at least partly based on the identification of the user, the client, or information associated with the user or client, so that different clients may received different malware configuration information. The client may send to a server, such as a content server, information that is employed by the server to determine malware configuration information to return. This information may include geographic information, group membership, subscription information, user preferences, technical specifications or capacities of the client, or other information.

The process may then return to a calling process, where other actions may be performed.

FIG. 5 illustrates a flow diagram generally showing one embodiment of a process 500 for detecting and handling malware. Process 500 may be implemented within various components of a client device, such as client device 102 of FIG. 1. Process 500 may be performed in conjunction with an IM system, such as illustrated in FIG. 1.

Process 500 begins, after a start block, at block 502, where initialization actions are performed. Process 400 of FIG. 4 illustrates initialization actions in one embodiment of the invention. Though not illustrated in FIG. 5, one or more other client devices, such as client device 104, may perform initialization actions such as process 400, before, after, or concurrently with initialization performed by the client device performing process 500, such as client 102. In one embodiment, the actions of blocks 502-516, or a portion thereof, may be performed by the malware logic component 262 or the scanner registry 264 of FIG. 3.

Figure 7:
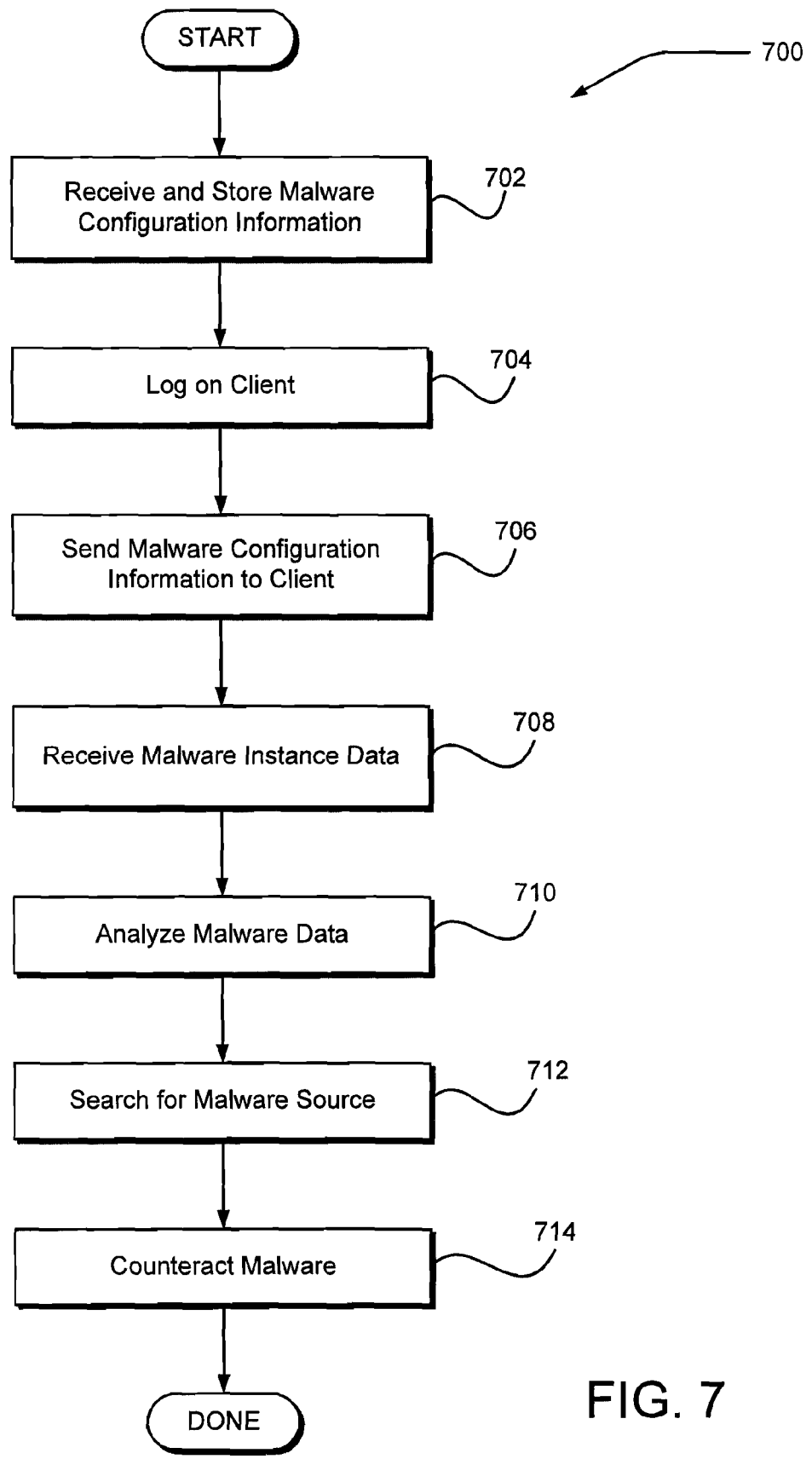
FIG. 7 illustrates a flow diagram generally showing a process for configuring, enabling, and handling malware security, in accordance with an embodiment of the invention.

Though not illustrated in FIG. 5, one aspect of the invention includes establishing the malware configuration information on content server 112. This aspect is illustrated in FIG. 7, and described in associated text herein. Generally, this may include a systems administrator interfacing with content server 112 to establish the configuration information The process may flow to block 504, where an instant message is received. This may occur as a result of an IM sent from another client, such as client 104. As discussed herein, an IM may include text, a photo, a pictures, audio, or video. An IM message from another client may have been forwarded by an intermediary connection server or from an event server. In one embodiment, an IM message is received from another client without being forwarded by a connection server or an event server.

The process may flow to block 506, where actions to be performed related to the received instant message are determined. This determination may be made based on one or more criteria. At least a portion of the logic, rules, or data used to make this determination may be included in the malware configuration information received by the client, such as during the actions of block 414 of process 400. FIG. 5 illustrates three actions and corresponding process flows that may occur, though in some embodiments, more or less may occur.

If, at the decision block 506, it is determined to disallow the IM function associated with the received instant message, the process may flow to block 508, where the instant message is rejected. Rejection may occur, for example, if configuration data indicates that the sender of the message belongs to a group for which such messages are to be rejected. Rejection may include one or more of deleting all or a portion of the message, marking the message with a flag indicating rejection, replacing all or a portion of the message with other content, displaying some content to the user, or another action.

The process may then return to a calling program with an indication that the message is to be rejected, where other actions may be performed, or to wait for a next instant message.

If, at the decision block 506, it is determined that the received message is to be allowed without performing malware scanning, the process may return to a calling program with an indication that the message is to be allowed. Configuration information may indicate, for example, that instant messages from a specified sender do not require malware scanning, or that instant photo messages from a specified sender group do not require scanning. Allowing at least a portion of instant messages without performing malware scanning may reduce an amount of CPU usage on the client device.

If, at the decision block 506, it is determined that the received message is to be scanned, the process may flow to block 510, where malware scanning is performed. The action of performing malware scanning may include scanning by one or more malware scanners. A designation of which scanners to employ, and the order of their use, may be at least partially determined based on configuration information received from the content server. The designation of scanners or their order of use may be determined based on the type of instant message received, geographic information, group membership, or other information associated with the message sender, a security level designation, or other information. For example, configuration information may indicate that when an instant audio message is received, MW scanner 1 is to be employed first, followed by MW scanner 2, and when a photo message is received, MW scanner 3 is to be employed first, followed by MW scanner 1. In another example, configuration information may indicate that when an instant message is received from a designated geographic area, all MW scanners are to be employed, and when an instant message is received from another geographic area, only one or two MW scanners are to be employed. In one embodiment, more than one MW scanner may be employed at least partly concurrently. More than one MW scanner may concurrently scan the same message, or different messages.

In one embodiment, in an environment having multiple MW scanners, scanning may be terminated upon identifying malware in a message, such that subsequent scanning is not performed. In one embodiment, scanning may continue after malware is identified.

The process may flow to decision block 512, where a determination is made of whether malware has been found in or accompanying the instant messages. If it is determined that malware has not been found, processing may flow to the end of the process 500 and return to a calling program with an indication that the message and corresponding function is to be allowed.

If it is determined, at decision block 512, that an instance of malware associated with the instant message has been found, processing may flow to block 514, where error handling actions are performed. Error handling actions may include one or more of deleting all or a portion of the message, replacing all or a portion of the message with other content, displaying to the user content other than the received message, or another action. Error handling actions may include updating the MW configuration information stored on the client device based on the malware. For example, communication with the source of the instant message may be disabled.

The process may flow to block 516, where data relating to the instance of malware, the received message, or the detection of the malware is sent to a malware information repository (MIR), such as MIR 114 of FIG. 1. This may be performed by sending the data to a connection server, which may forward the data to a MIR. The information sent to the MIR may include any of an identification of the malware, the type or contents of the message containing the malware, the source of the message, identification of the scanner that detected the instance of malware, the identity of any scanners that may have scanned the message and not detected the malware, identification of related messages that may have accompanied, preceded, otherwise are associated with the instant message containing the malware, or the like. Upon receipt of the data, a MIR may perform one or more actions such as analyze the data, locate the source, or disable the source of the malware. The process may return to a calling program with an indication that malware has been found, or that the message is to be rejected.

It is to be noted that at least a portions of the process 500 may be performed concurrently with respect to more than one instant message, for example as multiple threads of operation. In one embodiment, two or more instant messages received at block 504 may be processed together in at least some of the subsequent actions of the process 500. For example, two instant messages, from the same or different senders, may be passed together to an MW scanner to perform scanning on both instant messages.

FIG. 6 illustrates a flow diagram generally showing one embodiment of a process 600 for detecting and handling malware. Process 600 may be implemented within various components of a client device, such as client device 102 of FIG. 1. Process 600 may be performed in conjunction with an IM system, such as illustrated in FIG. 1.

Process 600 is similar to process 500 described above. Process 600 illustrates a process in which determinations are made and scanning is selectively performed prior to sending an instant message. Many of the actions and determinations in process 600 are similar to corresponding actions and determinations of process 500, and much of the discussion of process 500 is applicable to process 600. The discussion that follows illustrates at least some of the differences.

Process 600 begins, after a start block, at block 602, where initialization actions are performed. Initialization may be substantially similar to the initialization as described for block 502 of FIG. 5. The process may flow to decision block 606, where actions to be performed related to the instant message to be sent are determined. The logic, rules, data, or criteria that are used in this determination is similar to the determination of corresponding decision block 506 of FIG. 5. However, the data or criteria of block 606 may relate to a recipient of the message, rather than a sender.

If, at the decision block 606, it is determined that the message is to be allowed to be sent without performing malware scanning, the process may return to a calling program with an indication that the message is to be allowed. This may selectively occur based on the identity of, or other factors relating to the recipient, or other factors.

If, at the decision block 606, it is determined that the message is to be rejected and not sent, without performing malware scanning, the process may return to a calling program with an indication that the message is to be rejected. This may selectively occur based on the identity of, or other factors relating to the recipient, or other factors.

If, at the decision block 606, it is determined that the outgoing message is to be scanned, the process may flow to block 610, where malware scanning is performed. The actions of blocks 610, 612, 614, and 616 may be substantially similar to the actions of corresponding blocks 510, 512, 514, and 516 of FIG. 5, as described herein. The process may exit and return to a calling program with an indication that malware has been found, or that a message is not to be sent.

FIG. 7 illustrates a flow diagram generally showing one embodiment of a process 700 for providing security in an instant messaging system. Process 700 may be implemented within a content server, such as content server 112, and a malware information repository (MIR), such as MIR 114, of FIG. 1. Process 700 may be performed in conjunction with an IM system, such as illustrated in FIG. 1, as well as processes 500 and 600, as described herein.

Process 700 begins, after a start block, at block 502, where a content server may receive and store malware configuration information. This may include a systems administrator communicating, directly or indirectly with content server 112 to establish and store the configuration information. This may include one or more communications, such that configuration information may be stored and updated any number of times. In one embodiment, configuration information may be communicated to content server 112 by event server 110, MIR 114, or another component.

The process may flow to block 704, where a client may be logged on to an IM system. As discussed herein, logging on to the system may include a connection server communicating with a client to authenticate the client. A connection server may send information relating to the client device to an event server, to facilitate locating the client in subsequent IM communication.

The process may flow to block 706, where malware configuration information may be sent to the logged in client. In FIG. 7, the action of block 706 is shown occurring after a client logs in. However, this action may be performed any number of times after a client is logged in, in order to update the malware configuration information that the client has stored. This action may occur at regular intervals, or in response to an update of the configuration data.

The actions of blocks 704 and 706 may correspond to the actions 412 and 414 of process 400, illustrated in FIG. 4. These actions may occur for each client that is in communication with the system, and may occur multiple times for any client.

The process may flow to block 708, where data relating to a client detection of a malware instance may be received from a client. This action may correspond to the action of block 516 of process 500.

The process may flow to block 710, where the MIR may perform an analysis of data received from one or more clients. This analysis may include determining locations of malware outbreaks, the distribution paths that an instance of malware may take, the times that an instance of malware may take to spread among clients, scanners that are effective in detecting the malware, and the like. The analysis may also include determining the effectiveness of malware detection and handling logic, as reflected in malware configuration information distributed to clients.

The process may flow to block 712, where the MIR may use the malware data to search for clients that are the original source of a malware instance. The process may flow to block 714, where the MIR may take actions to counteract the malware, isolate clients that are distributing the malware, or otherwise reduce the spread of the malware. The MIR may direct the IM system to disallow logging in by one or more offending clients, or to otherwise restrict their behavior. The MIR may use these results, as well as results of any other analysis of data received, individually or aggregated, to determine improved configurations that may be employed with the system. For example, if the MIR determines that a number of malware incidents originated from a specific geographic area or user group, the MIR may determine that malware configuration is to be updated to reflect an increased level of scrutiny of instant messages originating from the area or group. As another example, the MIR may determine that an ordering of malware scanners is to be modified based on received reports of detections or missed detections from the scanners. In one embodiment, the MIR may send, to the content server, data reflecting configuration updates that are to be made.

Each of the actions of process 700 may be performed any number of times, alone or in combination with each other, and in any ordering. The process may continue indefinitely, or return to a calling program, where other actions may be performed.

It will be understood that each block of the flowchart illustrations, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

Accordingly, blocks of the flowchart illustrations support combinations of means for performing the specified actions, combinations of steps for performing the specified actions and program instruction means for performing the specified actions. It will also be understood that each block of the flowchart illustrations, and combinations of blocks in the flowchart illustrations, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. On a client device, a method for providing security from instant messaging malware, comprising:
   receiving, from a server, malware configuration information stored on the server;
   receiving at least one instant message from an instant message system;
   selecting from a plurality of malware scanning components a subset of two or more malware scanners based on the malware configuration information;
   employing the selected malware scanners to scan the instant message for malware, at least partly based on the malware configuration information;
   if at least one of the selected malware scanners detects malware, then inhibiting at least one other of the selected malware scanners from scanning;
   transmitting to the server an identification of the detected malware and an identification of the at least one of the selected malware scanners that detected the malware;
   receiving, in response to the transmission, further configuration information providing an order for applying the selected scanners to subsequent instant messages, the further configuration information is based on a determination of effectiveness of the selected scanners in detecting malware as made from the transmission; and
   altering application of the selected scanners so that the selected scanners are applied on the subsequent instant messages in the order specified in the further configuration information.

2. The method of claim 1, further comprising selecting the subset of malware scanners from the plurality of malware scanning components installed on the client device, at least partly based on a characteristic of the client device or the identification of the user.

3. The method of claim 1, further comprising selectively employing another malware scanner to concurrently scan another instant message for malware, at least partly based on the malware configuration information.

4. The method of claim 1, further comprising:
   selectively employing another malware scanner to scan the instant message for malware, at least partly based on the malware configuration information; and
   determining an ordering to employ the malware scanner and the other malware scanner, at least partly based on information associated with the instant message.

5. The method of claim 1, wherein selectively employing the malware scanner is at least partly based on at least one of a geographic location associated with a sender of the instant message, a group membership associated with the sender of the instant message, or a type of the instant message.

6. The method of claim 1, further comprising if malware associated with the instant message is detected, sending information associated with the detected malware to a malware information repository.

7. The method of claim 1, further comprising if malware associated with the instant message is detected, disabling a function associated with a type of the instant message.

8. The method of claim 1, further comprising
   selectively scanning another instant message for malware, at least partly based on the malware configuration information; and
   selectively sending the other message to another client device, at least partly based on the selective scanning of the other instant message.

9. The method of claim 1, wherein the malware configuration information received from the server is at least partly based on information sent from the client device to the server that includes at least one of geographic information, group membership, subscription information, preferences, or capacities associated with the client device.

10. The method of claim 1, further comprising:
    detecting another instant message to be sent from the client device; and
    employing the plurality of malware scanners on the other instant message for malware, at least partly based on the malware configuration before the other message is allowed to be transmitted by the client device to another client device.

11. A system for providing security comprising
    a processor and a processor readable memory comprising program logic that causes the processor to:
    receive from a server, malware configuration information stored on the server;
    receive an instant message from an instant message system;
    select from a plurality of malware scanning components, a subset of two or more malware scanners based on the malware configuration information;
    employ the selected malware scanners to scan the instant message for malware based at least on the malware configuration information;
    if at least one of the selected malware scanners detects malware, then inhibit at least one other of the selected malware scanners from scanning;
    transmit to the server an identification of the detected malware and an identification of the at least one of the selected malware scanners that detected the malware;
    receive in response to the transmission, further configuration information providing an order for applying the selected scanners to subsequent instant messages, the further configuration information is based on a determination of effectiveness of the selected scanners in detecting malware as made from the transmission;
    alter application of the selected scanners so that the selected scanners are applied on the subsequent instant messages in the order specified in the further configuration information.

12. A computing device for providing security to a plurality of client devices communicating by sending and receiving instant messages, the computing device comprising:
- a memory for storing a plurality of components; and
- a processor for executing components, including:
  - at least one content component that receives and stores malware configuration information, and sends the malware configuration information to each client device, the malware configuration information enabling each of the plurality of client devices to selectively scan instant messages for malware, the malware configuration information enabling each client device to select from a plurality of malware scanning components, a subset of two or more malware scanners to be employed to scan instant messages based in part on a characteristic of each client device; and
  - a repository component that determines from malware reports transmitted by the plurality of clients, an identity of malware detected by a client of the plurality of clients and an identification of at least one of the malware scanning components that detected the malware, the repository component configured to determine effectiveness of malware detection by the subset of selected malware scanners based on the malware reports and provide to the plurality of client devices, within further configuration information an order of applying the subset of malware scanners to scan instant messages based on the determined effectiveness.

13. The computing device of claim 12, further comprising a malware searching component that performs actions, including:
- based on the malware reports, determines a source of at least one malware instance; and
- generates additional malware configuration information that enables each of the plurality of clients to restrict instant messaging communication with the source of the at least one malware instance.

14. The computing device of claim 12, further comprising an interface to another system that enables the other system to restrict communication with a source of at least one malware instance, based on the malware reports, wherein the communication is at least one of an email communication or a communication with a web site.

15. The computing device of claim 12, wherein the malware configuration information enables each of the plurality of clients to determine an instant messaging function to be disabled and to at least partially disable the determined instant messaging function.

16. The computing device of claim 12, wherein the malware configuration information enables each of the plurality of clients to, in response to receiving an instant message, determine a malware scanner to invoke at least partially based on at least one of a source of the instant message, a type of the message, or a location of the receiving client.

17. A system for providing security to a plurality of client devices communicating by sending and receiving instant messages, the system comprising a processor and a processor readable memory comprising program logic which when executed by the processor causes the processor to:
- receive from at least one of a plurality of client devices, malware configuration information comprising an identification of a detected malware and an identification of the one or more of a selected plurality of malware scanners that detected the malware;
- store the received malware configuration information;
- distribute the malware configuration information to each of the plurality of client device
- cause each of the plurality of client devices to selectively scan instant messages for malware including instant messages originating at the client device and prior to the instant message being transmitted from the client device to another client device; and
- enable each client device of the plurality of client devices to selectively determine at least two malware scanners to invoke for scanning a received instant message, to selectively scan the received instant message, and to selectively restrict instant messaging communication, at least partly based on information associated with the received instant message.

18. The system of claim 17, further comprising an instant messaging system, and that distributes at least a portion of the malware configuration information to each client device of the plurality of client devices in response to each client device logging on to the instant messaging system.

19. The system of claim 17, further comprising a malware information repository that receives reports of a plurality of malware instances from client devices of the plurality of client devices, processes the reports, and determines sources of the plurality of malware instances.

20. The system of claim 17, wherein enabling each client device to selectively invoke a malware scanner further comprises transmitting computer-executable instructions, wherein the execution of the computer-executable instructions provides for enabling actions including registering at least one malware scanner and selectively scanning the received instant message at least partly based on information associated with the received instant message.

* * * * *